United States Patent
Coffey et al.

(10) Patent No.: US 7,170,271 B2
(45) Date of Patent: Jan. 30, 2007

(54) USE OF CHARGE PUMP ACTIVE DISCHARGE

(75) Inventors: Anthony Coffey, Swindon (GB); Alan Somerville, Chippenham (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 331 days.

(21) Appl. No.: 10/859,799

(22) Filed: Jun. 3, 2004

(65) Prior Publication Data

US 2005/0248967 A1   Nov. 10, 2005

(30) Foreign Application Priority Data

May 7, 2004  (EP) ................... 04392025

(51) Int. Cl.
*G05F 1/40*   (2006.01)
(52) U.S. Cl. .................. 323/284; 323/283; 323/288
(58) Field of Classification Search ............. 323/274, 323/280, 282, 283, 284, 288; 363/59; 327/535, 327/536, 537
See application file for complete search history.

(56) References Cited

U.S. PATENT DOCUMENTS

| | | | |
|---|---|---|---|
| 4,667,118 A | 5/1987 | Maruta | 307/273 |
| 5,680,300 A | 10/1997 | Szepesi et al. | 363/59 |
| 5,841,648 A | 11/1998 | Mansfield | 363/59 |
| 5,870,000 A | 2/1999 | Matsuda et al. | 331/34 |
| 5,929,618 A * | 7/1999 | Boylan et al. | 323/282 |
| 6,137,275 A * | 10/2000 | Ravon | 323/274 |
| 6,226,193 B1 | 5/2001 | Bayer et al. | 363/59 |

FOREIGN PATENT DOCUMENTS

JP    2000268562    9/2000

* cited by examiner

*Primary Examiner*—Jessica Han
(74) *Attorney, Agent, or Firm*—Saile Ackerman LLC; Stephen B. Ackerman

(57) ABSTRACT

A DC-to-DC voltage converter having an active charge/discharge circuit enabling the definition of any output voltage within its operating range has been achieved. A comparator compares the output voltage of a voltage converter with a defined reference voltage. This reference voltage can be easily modified within its operating range. In case the output voltage of the voltage converter is higher than said reference voltage a "reservoir" capacitor at the output of said voltage is discharged via an active charge/discharge circuit until the output voltage equals said reference voltage. Said active charge/discharge circuit is activated via a latch by said comparator. The invention is applicable for any type of DC-to-DC converters, such as e.g. charge pumps, buck converters and boost converters.

21 Claims, 2 Drawing Sheets

USE OF CHARGE PUMP ACTIVE DISCHARGE

BACKGROUND OF THE INVENTION (1) Field of the Invention

This invention relates generally to voltage converter circuits using charge pumps and relates more particularly to charge pumps, which have regulation and an active charge/discharge function.

(2) Description of the Prior Art

Charge pumps are circuits that generate a voltage larger than the supply voltage from which they operate. Charge pumps are a form of DC—DC converters that rely on capacitors instead of inductors for energy storage and transfer. The absence of inductors makes them attractive in situations requiring a low-power auxiliary supply. They use less circuit-board area, offer minimal component height, and are easy to use.

Charge pumps are switching capacitors circuits. The basic circuit is made from switches and capacitors. Charge pumps work as fixed multipliers, positive or negative, of the supply voltage. In order to generate twice the supply voltage two capacitors are required. One capacitor is a "flying" capacitor actually doing the pumping and one capacitor is acting as a reservoir, holding the generated voltage.

In order to generate three times the supply voltage two flying capacitors are required and one reservoir capacitor, in order to generate four times the supply voltage three flying capacitors are required and one reservoir capacitor, etc. for five times the supply voltage.

Charge pumps can have regulated or unregulated outputs. An unregulated charge pump either doubles or inverts the voltage that powers it and the output voltage is a function of the supply voltage. A regulated charge pump either boosts or inverts the supply voltage. Its output voltage is independent of the supply voltage.

Active discharge circuits in voltage charge pumps are normally used to shut down the circuit or reduce the output voltage to an initial value.

There are patents known using charge pumps within voltage converters:

U.S. Pat. No. 6,226,193 to Bayer et al.) describes a DC/DC converter operating on the charge pump principle, regulated to a fixed, predetermined output voltage and comprising two charge pump capacitors switched in a switch matrix consisting of nine switches. A control circuit is provided capable of controlling the switches so that the charge pump is changed over between a charging phase and a discharge phase and which is capable of operating the charge pump in two modes having different voltage gain factors (1.5; 2). The regulator comprises furthermore a regulator circuit capable of setting when the charge pump is active in the charging phase in the first mode the ON resistance of a switch present in the charge path of the charge pump capacitors or in the second mode the ON resistances of two switches present each in one of the charging paths of the first or second charge pump capacitor so that the charging voltage presented to the charge pump capacitors in the charging phase assumes the minimum value possible for a specific input voltage of the converter, a measuring circuit capable of defining the voltage occurring at one of the charge pump capacitors at a defined point in time of the charging phase; and a comparator capable of comparing the measured voltage to a predetermined voltage and then when the former attains the latter, changing over the charge pump into the corresponding other mode, wherein the predetermined voltage is selected so that the efficiency of the converter is optimized and the charging condition of the charge pump capacitors is not altered on changeover.

U.S. Pat. No. 5,841,648 to Mansfield) discloses an adjustable charge pump design employing a variable voltage level means to reduce the charge on the charge pump charging capacitor. The charge pump output is thereby controlled without the use of any secondary pass elements applied to the charge pump output voltage. The variable voltage level means, e.g. a variable resistor, "steals" voltage from the charging capacitor in either an inverting charge pump configuration or a doubling configuration. The voltage converter employing the adjustable charge pump is advantageously applied to providing an adjustable contrast control for an LCD display. Certain intrinsic safety requirements are achievable with the present design thereby making possible a backlit, intrinsically safe LCD display.

U.S. Pat. No. 5,680,300 to Szepesi to Park et al.) describes a charge pump controller providing the timing and drive voltages necessary for a self-regulated charge pump voltage converter. The controller utilizes a conventional non-overlapping two-phase clock to control the timing of switch drivers, which control an array of switches. Pump and reservoir capacitors are distributed within the array. One of the switch drivers produces a modulated, or linear, drive voltage for one of the switches in the array in response to the charge pump's output voltage. The controller thereby produces a regulated output voltage from the charge pump.

SUMMARY OF THE INVENTION

A principal object of the present invention is to achieve a DC-to-DC voltage converter having an active charge/discharge circuit wherein any output voltage can be easily defined.

In accordance with the objects of this invention a DC-to-DC voltage converter having an active charge/discharge circuit wherein any output voltage can be easily defined has been achieved. Said DC-to-DC voltage converter comprises, firstly, a voltage converter having an input voltage and an output voltage, wherein the input is connected to a means of capacitance and to an active device, which can discharge on a discharge signal, said means of capacitance. Furthermore the DC to DC converter invented comprises an active device being able to discharge a means of capacitance, wherein said active device is connected to the output of said voltage converter and to said means of capacitance and is receiving a discharge signal from a control logic, a means of capacitance connected to ground and to the output of said voltage converter, and a control logic having an input and an output. Said control logic comprises a comparator, wherein the input of said comparator is the output voltage of said voltage converter and a reference voltage and a output voltage indicating if said output voltage of said voltage converter equals or is smaller than said reference voltage, and a latch, wherein the input is the output of said comparator and a signal to start the discharge of said means of capacitance and the output of said latch is a signal to said active device to start the discharge of said means of capacitance if said input signal of the latch to start the discharge is ON and the output signal of said comparator indicates that the output voltage of the voltage converter is higher than said reference voltage and wherein said output signal of said latch interrupts the discharge of said means of capacitance if the output of said comparator indicates that the output voltage of the voltage converter equals or is lower than said reference voltage.

In accordance with the objects of this invention a method for a DC-to-DC voltage converter having an active charge/discharge circuit to define any output voltage has been achieved. Said method comprises, firstly, providing a voltage converter, a means of capacitance, an active device to discharge said means of capacitance, and a control logic circuit. The steps of the method invented are (1) to start voltage converter, (2) to check output voltage of voltage converter (3) if output voltage of voltage converter is higher than a reference voltage go to step (4), else go to step (2), (4) to discharge means of capacitance, (5) to check output voltage of voltage converter, (6) if output voltage of voltage converter is equal or lower than a reference voltage go to step (7), else go to step (4), and (7) to stop discharge means of capacitance.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose a novel circuit using an active charge/discharge circuit and a related method to actively set the voltage converter to a programmed value. In prior art active discharge circuits are used to either reduce the output voltage to 0V or to an initial value. The present invention is thus characterized by allowing an active discharge circuit to set the output voltage to any voltage within its operating range.

Figure 1:
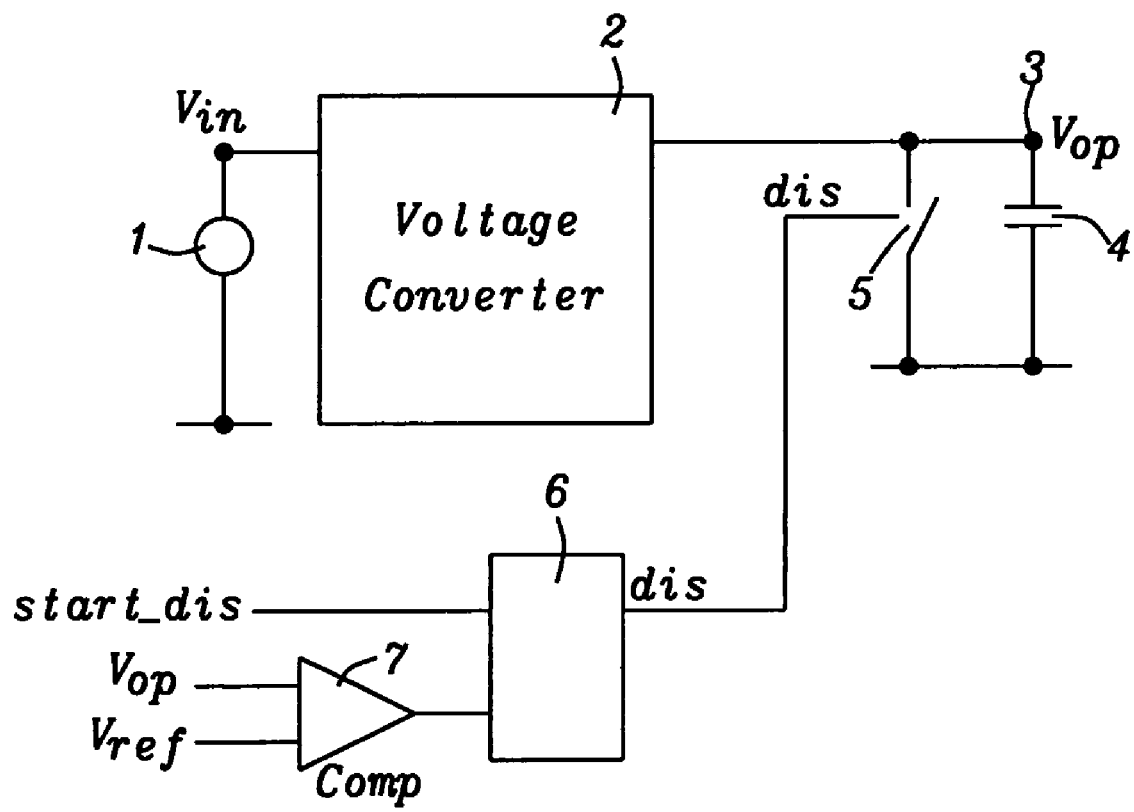
FIG. 1 shows a principal schematic of the present invention.

FIG. 1 shows an example of the present invention of a regulated voltage charge pump. A power supply 1 supplies an input voltage $V_{in}$ to a DC-to-DC voltage converter. This DC-to-DC voltage converter 2 could be any type of voltage converter, e.g. a buck converter, a boost converter or a charge pump 2. In a preferred embodiment a charge pump is used for converting the input DC voltage. An active device 5, e.g. a switch, can discharge the $V_{op}$ voltage stored on the "reservoir" capacitor 4 holding the converted voltage. Said active device 5 is activated by the signal "dis". The active discharge sequence is initiated by the logic signal "start_dis" shown in FIG. 1. The "start_dis" signal can be provided by an e.g. a microprocessor or an intelligent device controlling the charge pump. Latch 6 switches after receiving the signal "start_dis" and hence provides the signal "dis", thus causing the active device 5 to start discharging capacitor 4.

The active device 5 used needs to be switchable from providing a high electrical resistance between the output voltage $V_{op}$ 3 and ground to having a low resistance. In a preferred embodiment a MOS transistor has been used as such an active device 5. Any alternatives, which can switch between high and low impedance, would be suitable.

After the logic signal "start_dis" is set, the voltage comparator 7 compares the voltage $V_{op}$ stored on capacitor 4 with the voltage $V_{ref}$. $V_{ref}$ is the voltage to which the voltage $V_{op}$ needs to be discharged. When the output of the comparator 6 becomes true, in other words, if $V_{op}$ equals Vref, latch 6 is switched back, thus stopping voltage $V_{op}$ to discharge any further. The input signals $V_{op}$ and $V_{ref}$ can also be scaled versions of $V_{op}$ and $V_{ref}$.

A modified output voltage, that means a modified $V_{ref}$ can be programmed from an intelligent device which controls the charge pump such as e.g. a microprocessor used in a preferred embodiment.

It has to be understood that the invention is independent of a type of active charge/discharge scheme in place or of the scheme of regulation used. The invention is applicable even if the voltage regulator is unregulated, that means that a regulation is performed by regulating the supply voltage.

Figure 2:
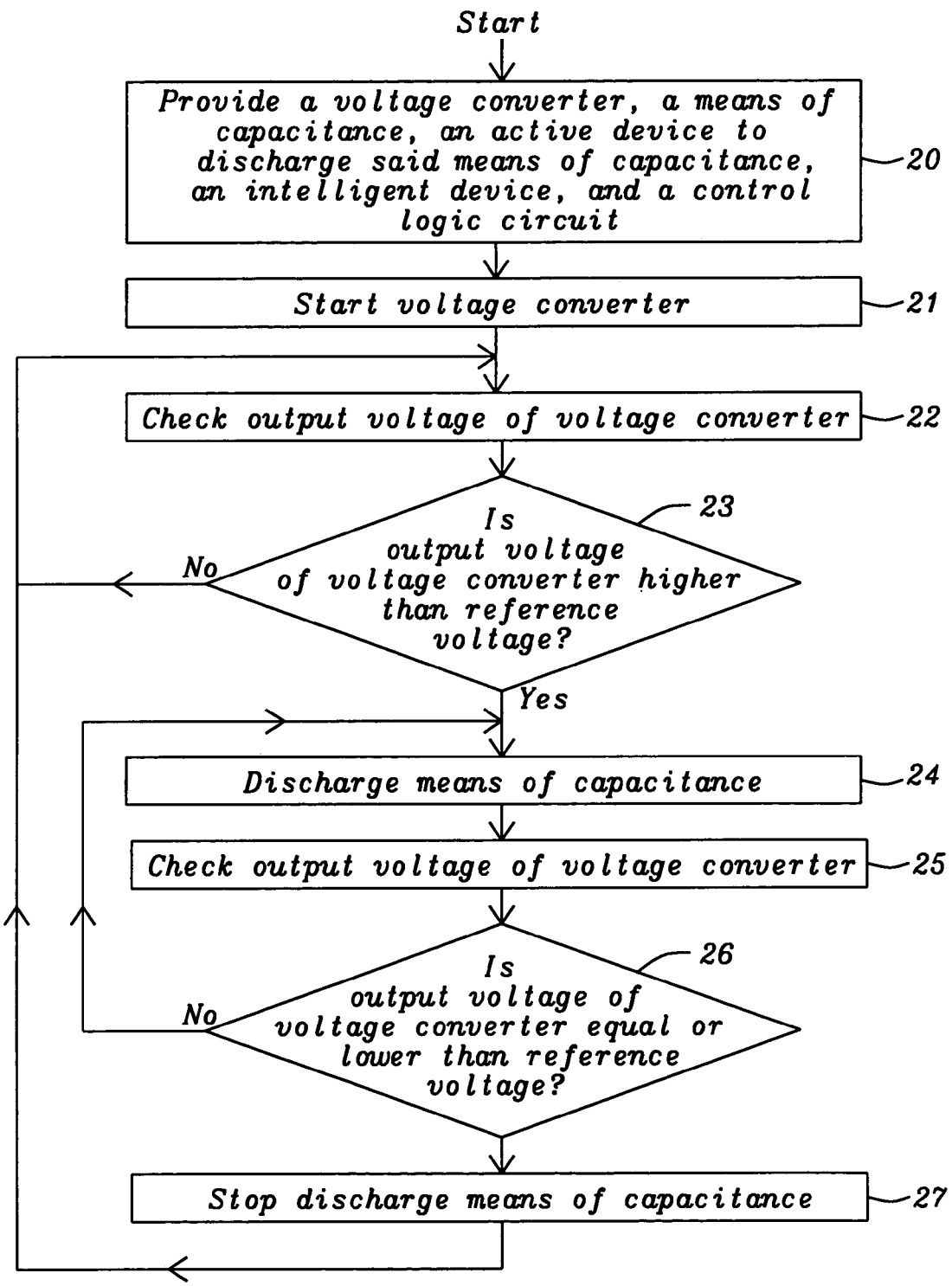
FIG. 2 shows a flowchart of a method invented for a DC-to-DC voltage converter having an active charge/discharge circuit to define any output voltage.

FIG. 2 shows a related method for a DC-to-DC voltage converter having an active charge/discharge circuit to define any output voltage. Step 20 describes the provision of a voltage converter, a means of capacitance, an active device to discharge said means of capacitance, an intelligent device, and a control logic circuit. In step 21 the voltage converter is started. In step 22 the output voltage of the voltage converter is checked. If in step 23 the output voltage of the voltage converter is higher than a reference voltage said means of capacitance is started to be discharged in step 24; otherwise the process flow is going back to step 22. In step 25 the output voltage of the voltage converter is checked again. If in step 26 the output voltage of the voltage converter is equal to or lower than a reference voltage the discharge of said means of capacitance stops in step 27 and the process flow is then going back to step 22; otherwise if in step 26 the output voltage of the voltage converter is higher than a reference voltage the process flow is going back to step 24 and the discharging of said means of capacitance is continued.

The main advantage of the present invention is that a voltage converter can be programmed very easy and fast to another voltage within its operating range.

While the invention has been particularly shown and described with reference to the preferred embodiments thereof, it will be understood by those skilled in the art that various changes in form and details may be made without departing from the spirit and scope of the invention.

What is claimed is:

1. A DC to DC voltage converter having an active charge/discharge circuit wherein any output voltage can be easily defined is comprising:

a reference voltage;

a voltage converter having an input voltage and an output voltage, wherein the output is connected to a means of capacitance and to an active device, which can discharge on a discharge signal said means of capacitance;

an intelligent device controlling said DC-to-DC voltage converter;

said active device being able to discharge said means of capacitance, wherein said active device is connected to the output of said voltage converter and to said means of capacitance and is receiving a discharge signal from a control logic;

said means of capacitance connected to ground and to the output of said voltage converter; and said control logic circuit having an input and an output, comprising:

a comparator, having inputs and an output, wherein a first input of said comparator is the output voltage of said voltage converter and a second input is said reference voltage and the output voltage of said comparator is indicating if said output voltage of said voltage converter equals or is smaller than said reference voltage; and a latch, wherein the input is the output of said comparator and a signal to start the discharge of said means of capacitance and the output of said latch is a signal to said active device to start the discharge of said means of capacitance if said input signal of the latch to start the discharge is ON and the output signal of said comparator indicates that the output voltage of the voltage converter is higher than said reference voltage and wherein said output signal of said latch interrupts the discharge of said means of capacitance if the output of said comparator indicates that the output voltage of the voltage converter equals or is lower than said reference voltage.

2. The DC-to-DC voltage converter of claim 1 wherein all components are integrated in an integrated circuit (IC).

3. The DC-to-DC voltage converter of claim 2 wherein said integrated circuit (IC) is implemented in CMOS technology.

4. The DC-to-DC voltage converter of claim 1 wherein said means of capacitance is a capacitor.

5. The DC-to-DC voltage converter of claim 1 wherein said capacitor is an external capacitor of an integrated circuit.

6. The DC-to-DC voltage converter of claim 5 wherein said integrated circuit (IC) is implemented in CMOS technology.

7. The DC-to-DC voltage converter of claim 1 is a boost converter.

8. The DC-to-DC voltage converter of claim 1 is a buck converter.

9. The DC-to-DC voltage converter of claim 1 is a charge pump.

10. The DC-to-DC voltage converter of claim 1 wherein the input signals of said comparator are scaled versions of said reference voltage and said output voltage of said voltage converter.

11. The DC-to-DC voltage converter of claim 1 wherein said active device is a relay.

12. The DC-to-DC voltage converter of claim 1 wherein said active device is a transistor switch.

13. The DC-to-DC voltage converter of claim 1 wherein said transistor switch is a MOS transistor.

14. The DC-to-DC voltage converter of claim 1 wherein said intelligent device is a microprocessor.

15. A method for a DC to DC voltage converter having an active charge/discharge circuit to define any output voltage is comprising: the following steps:
   providing a voltage converter, a means of capacitance, an active device to discharge said means of capacitance, an intelligent device controlling said voltage converter, a reference voltage, and a control logic circuit;
   (1) start voltage converter;
   (2) check output voltage of voltage converter;
   (3) if said intelligent device has issued a signal to initiate a discharge sequence and an output voltage of voltage converter is higher than said reference voltage go to step (4), else go to step (2);
   (4) discharge means of capacitance;
   (5) check output voltage of voltage converter;
   (6) if output voltage of voltage converter is equal or lower than said reference voltage go to step (7), else go to step (3); and
   (7) stop discharge means of capacitance.

16. The method of claim 15 wherein said means of capacitance is a capacitor.

17. The method of claim 15 wherein a comparator as part of said control logic is comparing the output voltage of said voltage converter with said reference voltage and is indicating the result.

18. The method of claim 15 wherein said reference voltage is programmed from said intelligent device.

19. The method of claim 15 wherein said intelligent device is a microprocessor.

20. The method of claim 15 wherein said active device is a transistor switch.

21. The method of claim 20 wherein said transistor switch is a MOS transistor.

* * * * *